US012775879B2

(12) United States Patent
Chatterjee et al.

(10) Patent No.: US 12,775,879 B2
(45) Date of Patent: Oct. 27, 2026

(54) ZERO CODE STREAM PROCESSING ENGINE FOR MACHINE INTERFACE

(71) Applicant: OPEN TEXT INC., Menlo Park, CA (US)

(72) Inventors: Souvik Chatterjee, Kolkata (IN); Vikas Reddy Varakantham, Choutuppal (IN)

(73) Assignee: OPEN TEXT INC., Menlo Park, CA (US)

( * ) Notice: Subject to any disclaimer, the term of this patent is extended or adjusted under 35 U.S.C. 154(b) by 651 days.

(21) Appl. No.: 18/295,056

(22) Filed: Apr. 3, 2023

(65) Prior Publication Data

US 2023/0315055 A1 Oct. 5, 2023

Related U.S. Application Data

(60) Provisional application No. 63/326,351, filed on Apr. 1, 2022.

(51) Int. Cl.
*G06F 7/00* (2006.01)
*G06N 20/00* (2019.01)

(52) U.S. Cl.
CPC .................................. *G06N 20/00* (2019.01)

(58) Field of Classification Search
CPC ..................................................... G06N 20/00
USPC .................................... 707/600–899; 706/12
See application file for complete search history.

(56) References Cited

U.S. PATENT DOCUMENTS

2017/0228253 A1* 8/2017 Layman ............. G06F 11/3013

* cited by examiner

*Primary Examiner* — Isaac M Woo
(74) *Attorney, Agent, or Firm* — Sprinkle IP Law Group

(57) ABSTRACT

A distributed, parallel processing, zero code stream processing orchestration platform for automating industrial robotic processes or machines is disclosed. In some embodiments, an orchestration engine functions as a machine interface and enables easy integration with business process management process engines or with an Internet-of-Things event stream platform.

16 Claims, 18 Drawing Sheets

ZERO CODE STREAM PROCESSING ENGINE FOR MACHINE INTERFACE

CROSS-REFERENCE TO RELATED APPLICATION(S)

This application claims a benefit of priority under 35 U.S.C. § 119(e) from U.S. Provisional Application No. 63/326,351, filed Apr. 1, 2022, entitled "ZERO CODE STREAM PROCESSING ENGINE FOR MACHINE INTERFACE," which is fully incorporated by reference herein for all purposes.

TECHNICAL FIELD

This disclosure relates generally to stream processing in a distributed computing environment. More particularly, this disclosure relates to a distributed, parallel processing, zero code stream processing orchestration platform for automating industrial robotic processes or machines, useful for various business process management automation solutions.

BACKGROUND

The term "business process" refers to a collection of related, structured activities or tasks performed by humans and/or machines for a particular purpose, for instance, to produce a product or provide a service. These activities or tasks follow a defined, specific sequence of steps and may or may not be visible to a purchaser of the product or a recipient of the service. In this context, business process management (BPM) involves a combination of a wide variety of business activity flows such as business process automation, modeling, and optimization, as well as people in different roles such as employees, customers, and external partners.

Today, BPM automation solutions are designed to respond to defined inputs from humans. The increasing demand for the application of artificial intelligence (AI) and machine learning (ML) in industrial manufacturing, scientific research, and healthcare introduces new opportunities and challenges to human-driven BPM automation solutions.

SUMMARY

A system is provided for zero code stream processing orchestration, the system including a processor, a non-transitory computer-readable medium, and instructions stored on the non-transitory computer-readable medium and translatable by the processor for providing a plurality of runtime services, including: a connector runtime configured for deploying a source connector for connecting to disparate source endpoints and streaming event streams from the disparate source endpoints, a stream processor configured for orchestrating microservices, including a machine learning (ML) service, operating on messages in the event streams, an artificial intelligence (AI) runtime configured for providing a distributed parallel processing microservice service bus and runtime that hosts a ML prediction service module, wherein the ML prediction service module is trained to make a prediction based at least in part on the messages from the stream processor, and a business process management (BPM) broker that operates as a managed dispatcher for automatically initiating BPM workflows based on the prediction.

Another embodiment provides a method for zero code stream processing orchestration, the method including composing a stream process with elements of various element types, and operating a stream processor to process the stream process, wherein the elements include a stream input element, a map operation element, and a condition element, wherein the stream input element represents a logical source event stream in a process orchestration that refers to a source endpoint as its source of an event stream, wherein the map operation element is configured for mapping each event in the event stream to a machine learning (ML) prediction service hosted in an artificial intelligence (AI) runtime or a service runtime, wherein the map operation element is configured for aggregating the events in the event stream based on time window, event count or logical expression and mapping the aggregated events to a ML prediction service hosted in an AI runtime or a service runtime, wherein the condition element is configured for controlling a flow of execution based on a specified Boolean expression, and wherein the flow of execution includes automatically initiating business process management (BPM) workflows.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

Figure 1:
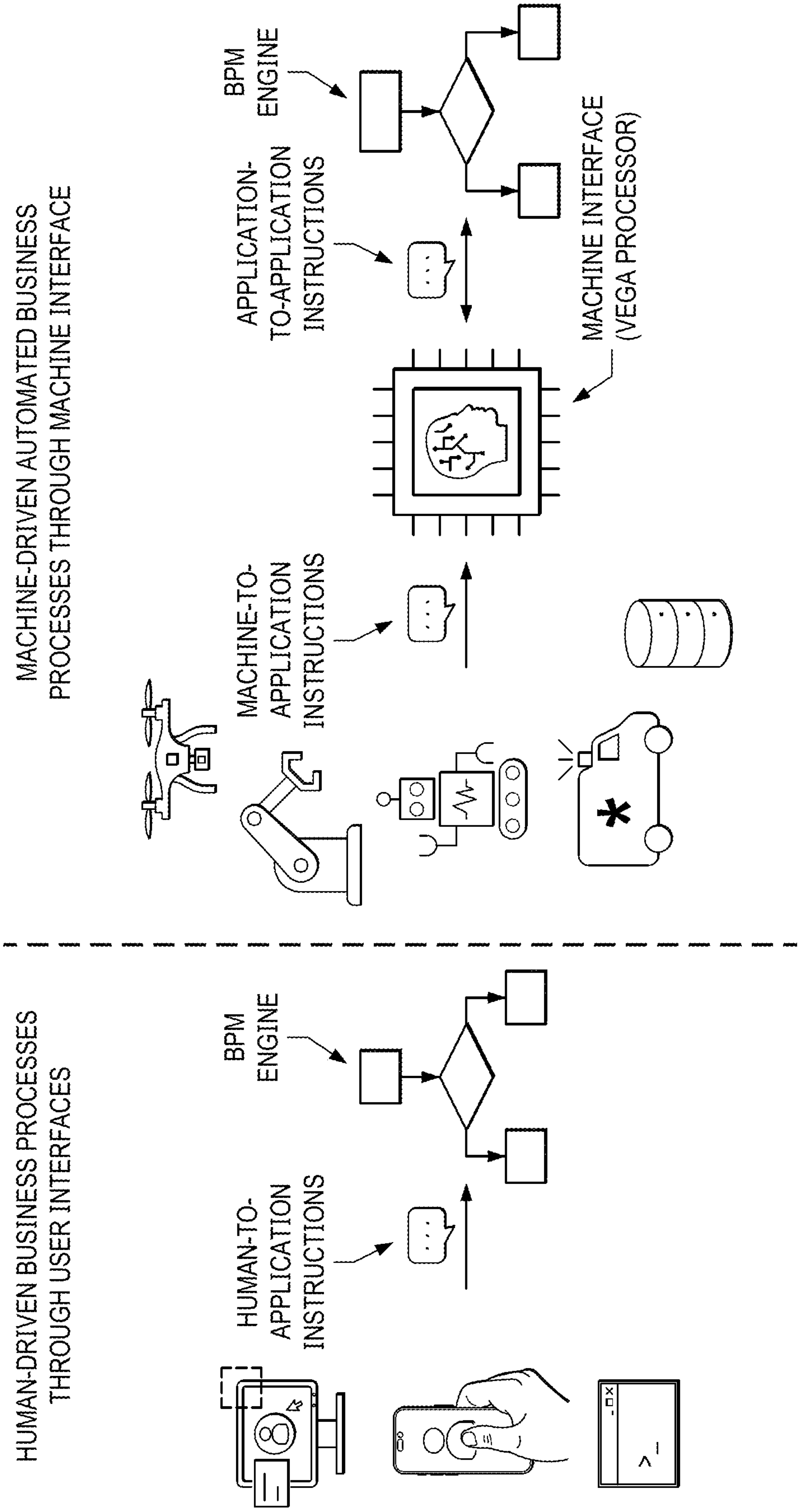
FIG. 1 depicts human inputs and/or instructions that are provided to BPM systems through user interfaces.

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As alluded to above, current BPM automation solutions are designed to respond to defined inputs from humans. As illustrated in FIG. 1, human inputs and/or instructions are generally provided to BPM systems through user interfaces. A goal of BPM involves continuously evaluate existing processes and identifying ways to improve them, With the introduction of 5G networks and satellite-based global high speed internet services, to achieve this goal and meet the increasing demand for application of AI and ML in BPM automation solutions, the current business processes will need to go through a significant transformation to understand and interact with machines.

To this end, this disclosure provides a distributed, parallel processing, zero code stream processing orchestration platform, sometimes referred to herein, for the purposes of this description and accompanying figures, as "Vega Processor," for automating industrial robotic processes or machines. As illustrated in FIG. 1, the orchestration engine (Vega Processor) functions as a machine interface and enables easy integration with BPM process engines or with any Internet-of-Things (IoT) event stream platform. The architecture and components of the orchestration engine will now be described, followed by a description of various types of elements that may be involved in a stream process handled by the orchestration engine. This disclosure includes an example use case that demonstrates how the orchestration engine can be implemented for a particular stream process.

Figure 2:
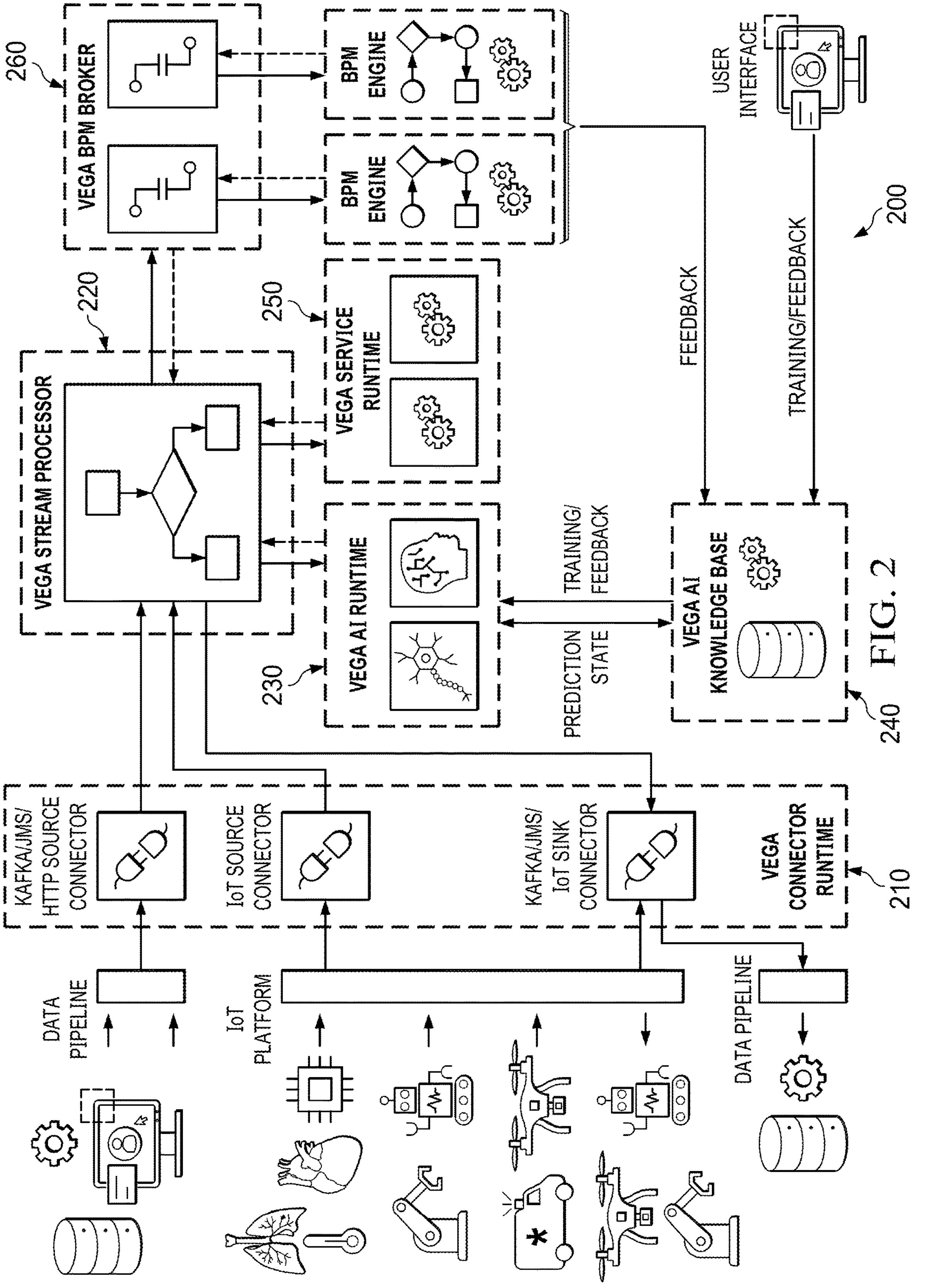
FIG. 2 depicts an example of a high level architecture of a processor operating in a distributed computing environment.

FIG. 2 depicts an example of a high level architecture of Vega Processor 200 operating in a distributed computing environment. In one embodiment, Vega Processor can be built on top of service-oriented and open system architecture. In some embodiments, Vega Processor is designed to be deployed on clusters of nodes for distributed parallel processing of high-speed event streams. In the example of FIG. 2, Vega Processor 200 includes, at a high level, a plurality of runtime services. Following is a description of the plurality of runtime services depicted in FIG. 2.

Connector runtime 210 provides a distributed runtime for deploying source and sink connectors for event streams. A process that runs in stream processor 220 (described below) is decoupled from the source and destination message channel or its protocol for its source and sink event streams respectively. Connectors deployed on connector runtime 210 are highly available, distributed, and load balanced. Stream processor 220 is the distributed and high-speed stream processing runtime that orchestrates microservices hosted as a Service or a ML Prediction Service. Beside supporting basic orchestration constructs, such as variable, condition, logical gate, timed gate, loop, branch, merge, stream processor 220 supports advanced stream processing capabilities such as stream join, stream snapshot, change log, group by, time window, data partitioning, map and reduce operations.

AI runtime 230 provides a distributed parallel processing microservice service bus and runtime that hosts ML prediction service modules. Lifecycle and execution of a ML prediction service is maintained by AI runtime 230. Further, AI runtime 230 supports online learning and feedback propagation to ML prediction service modules. AI knowledge base 240 provides a distributed, highly available (HA) and fast schema free secondary storage for training and prediction state data of ML prediction service modules. Further, AI knowledge base 240 supports auto training of models during fail-over, horizontal scaling and for reinforcement learning. Service runtime 250 is the distributed parallel processing microservice service bus and runtime for service modules. Lifecycle and execution of a service module, such as Map, Flat Map, or Reduce, is handled by service runtime 250. BPM broker 260 works as a managed dispatcher for BPM processes. It decouples the system services in Vega Processor from external BPM engines.

Figure 3:
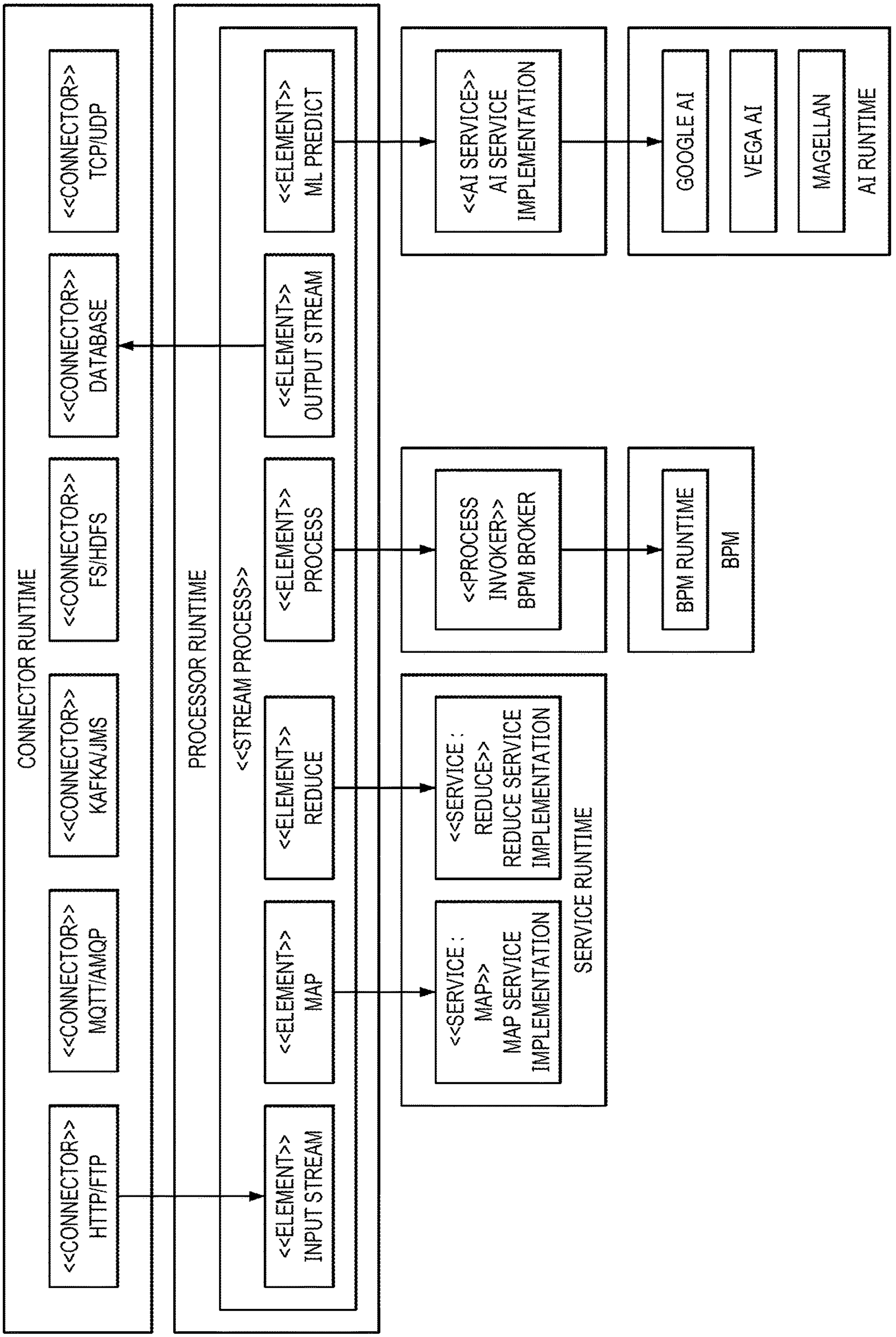
FIG. 3 depicts a flow diagram that illustrates an example of the processor of FIG. 2 in operation.

FIG. 3 depicts a flow diagram that illustrates an example of the orchestration engine (Vega Processor) in operation. In some embodiments, all artifacts, connectors, processes, or services are versioned, and parallel deployment of different versions are supported. With Vega Processor, a process can invoke different versions of a service without any conflict.

Traditionally, a business process is initiated through a human action. For instance, someone may wish to obtain a loan from a bank and initiate a loan application process. As another example, a doctor may accept a new patient and initiate a process to provide health care to that new patient. Each such process may involve one or more workflows. A workflow, in this case, refers to the procedural movement of information, material, and tasks from one participant to another (e.g., the loan applicant submitting necessary paperwork to the bank, the bank reviewing and considering approving or denying the loan application). A workflow, therefore, includes the procedure(s), the people, and the tools involved in each step of an overall business process.

To differentiate machine-initiated business processes from human-initiated business processes, machine-initiated business processes are referred to herein as "stream processes." In embodiments disclosed herein, a stream process is composed of elements of various types. Several exemplary element types are described below. In some embodiments, a stream process may not involve all of the element types described below. Further, in some embodiments, a stream process may involve zero, one, or multiple elements of each element type described below.

One type of stream process element is a source endpoint element. This stream process element is used to configure a connection to an external stream source, for instance, an IoT platform, an open-source distributed event streaming platform, a Java Message Service (JMS) destination in a one-to-many distribution model, etc. A source endpoint can be active, in which it actively listens for real time input stream, or it can be configured as scheduled. For instance, based on cron expression settings, a source endpoint can periodically read from an external data source. A cron expression is a string consisting of six or seven subexpressions (fields) that describe individual details of a schedule. Cron expressions are known to those skilled in the art and thus are not further described herein.

Figure 4:
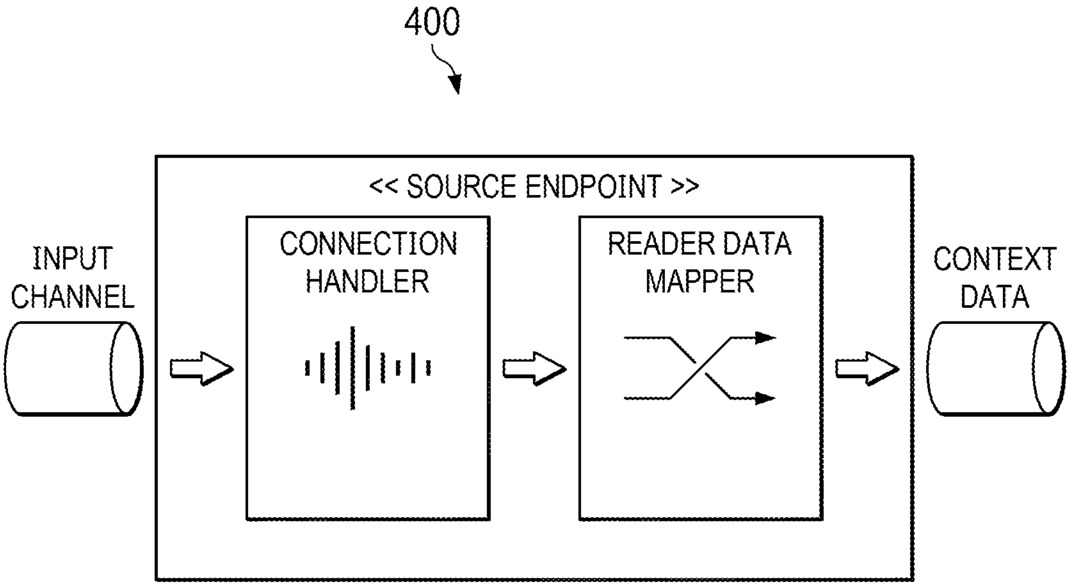
FIG. 4 depicts an example of a source endpoint.

An example of a source endpoint 400 is illustrated in FIG. 4. As illustrated in FIG. 4, based on the type of payload of an input stream, a source endpoint can be configured with an appropriate reader data mapper component such as JSON Reader Mapper, XML Reader Mapper etc. JSON and XML are known to those skilled in the art and thus are not further described herein. In the example of FIG. 4, source endpoint 400 has a connection handler component configured for communicating with an input channel.

Figure 5:
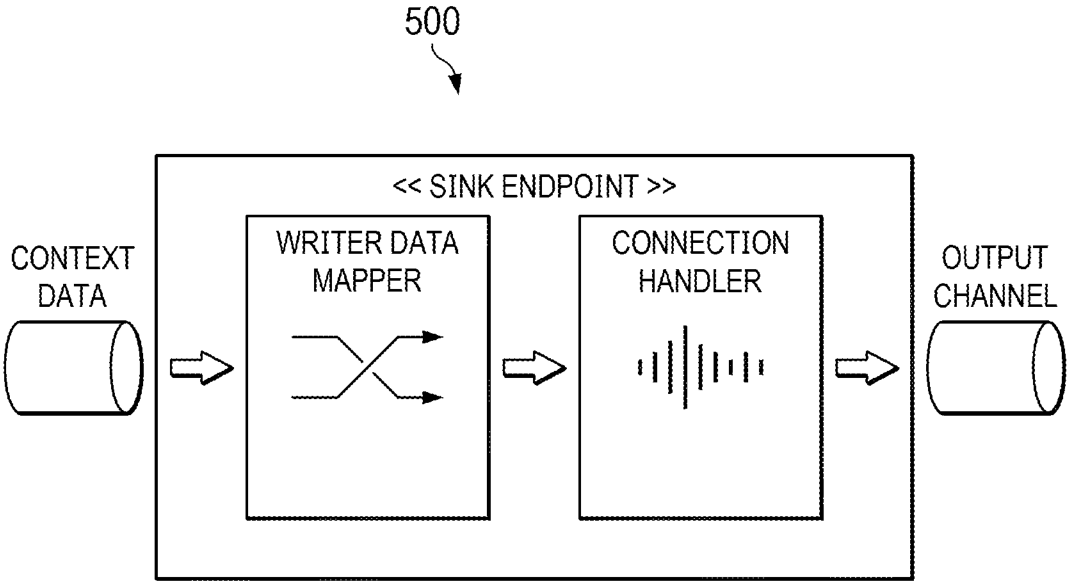
FIG. 5 depicts an example of a sink endpoint.

Another type of stream process element is a sink endpoint element. This stream process element is used to configure a connection to an external stream sink, such as for instance, an IoT platform, an open-source distributed event streaming platform, a JMS destination, or a data base table. An example of a sink endpoint 500 is illustrated in FIG. 5. As illustrated in FIG. 5, based on the type of payload supported by an output channel, a sink endpoint can be configured with an appropriate writer data mapper component such as JSON Writer Mapper, XML Writer Mapper etc.

Figure 6:
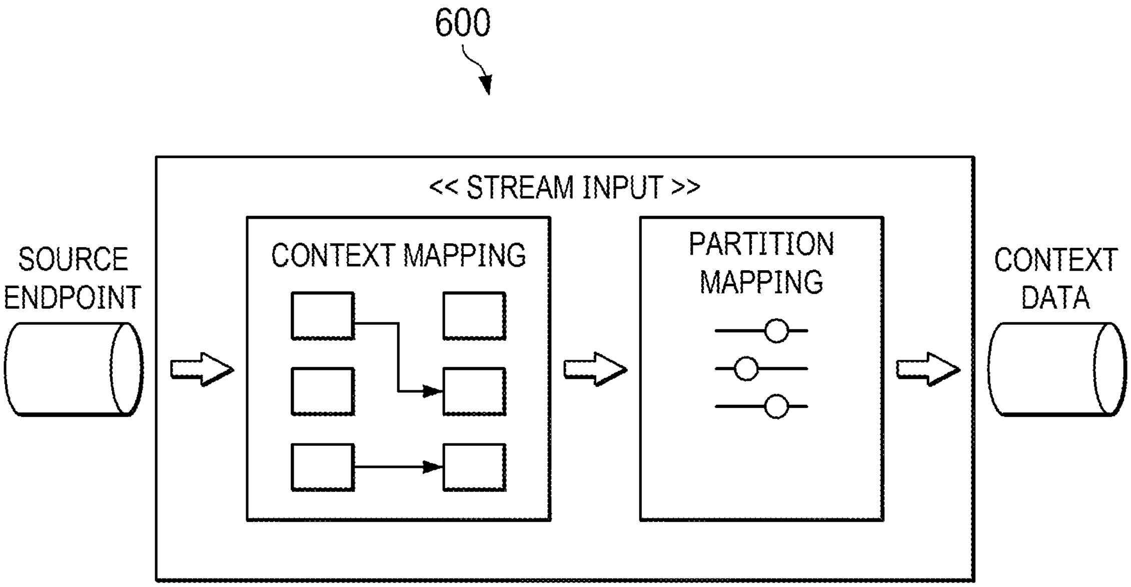
FIG. 6 depicts an example of a stream input element.

Another type of stream process element is a stream input element. This stream process element represents a logical source event stream in a process orchestration that refers to a source endpoint as its source of an event stream. An example of a stream input element 600 is illustrated in FIG. 6. In some embodiments, a process can define multiple stream input elements that consume data from the same source endpoint. This allows the same stream of input events to be processed in parallel paths for different purposes.

Figure 7:
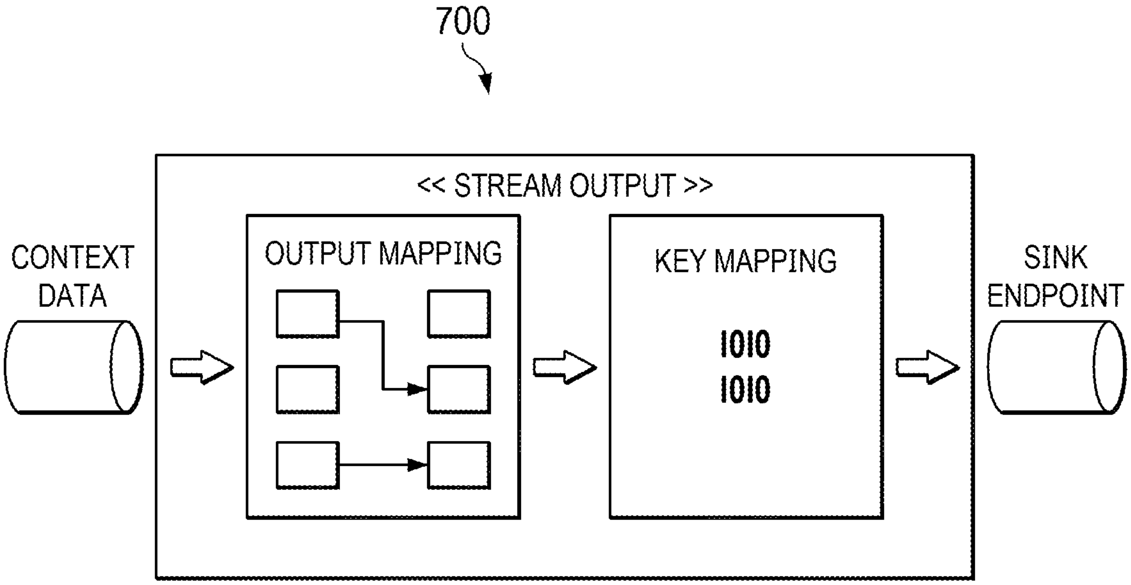
FIG. 7 depicts an example of a stream output element.

Another type of stream process element is a stream output element. This stream process element represents a logical stream sink in a process orchestration that refers to a sink endpoint as its destination of event stream. An example of a stream output element 700 is illustrated in FIG. 7. In some embodiments, a process can define multiple stream output elements that refer/write event stream to the same sink endpoint. This allows writing of event stream to the same output channel from parallel paths in the process.

Figure 8:
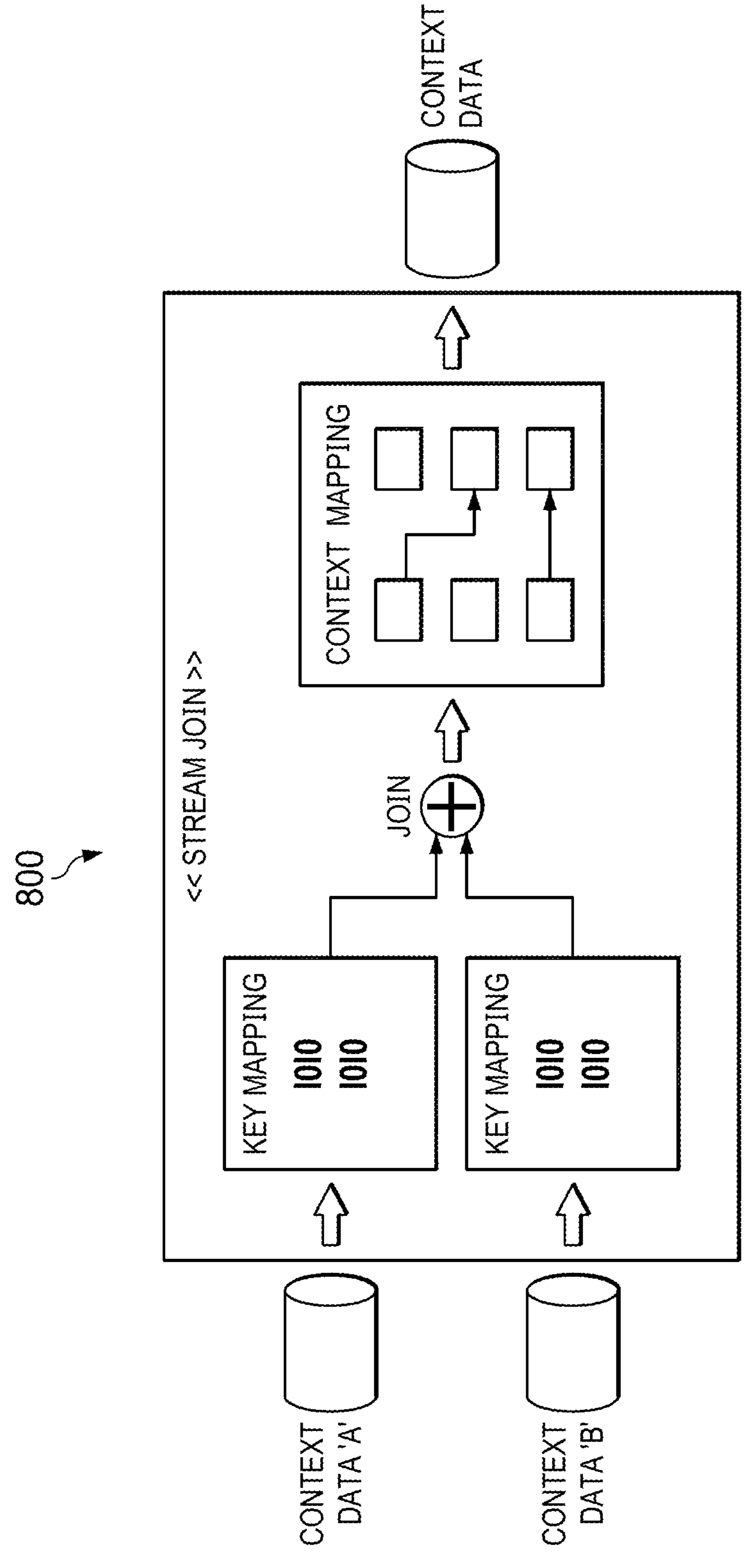
FIG. 8 depicts an example of a stream join element.

Another type of stream process element is a stream join element. This stream process element is used in a process to join two event streams of different structures of data from different stream input/paths. Like an SQL join, a stream join element allows three different kinds of join—inner join, left join or outer join. An example of a stream join element 800 is illustrated in FIG. 8. In some embodiments, input(s) to a stream join element can be set as snapshot. In that case, the stream join element will be triggered only when there is any change in any of the snapshot views of those input streams, suppressing duplicates. Frequency of messages in those input streams can be different. In some embodiments, one of the two input streams to a stream join element can be set as silent. In that case, changes to the other (non-silent) stream will trigger the join operation.

Figure 9:
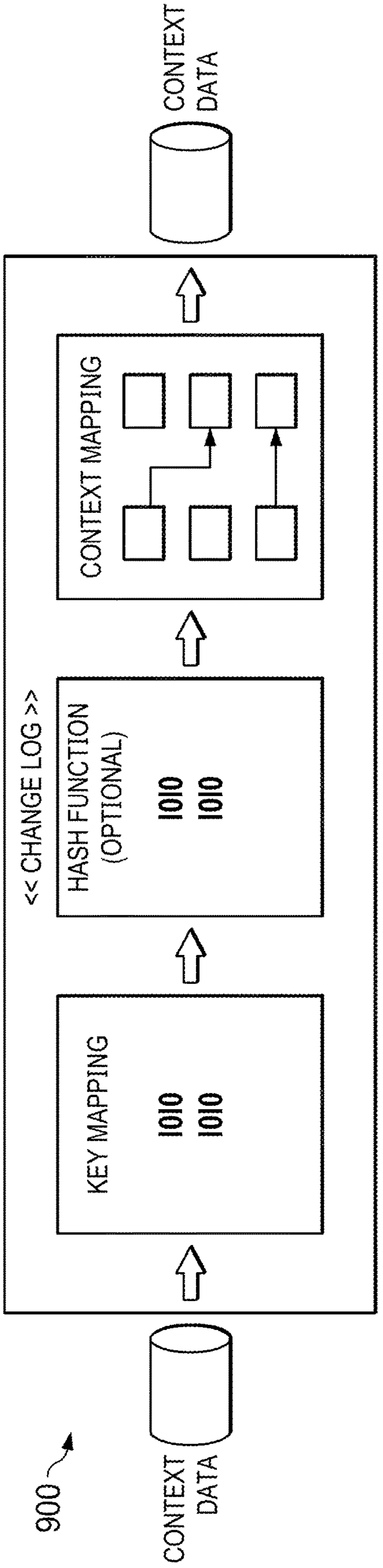
FIG. 9 depicts an example of a change log element.

Another type of stream process element is a change log element. This stream process element is used in a process to suppress duplicate messages in a stream process, for instance, through a key mapping component and a context mapping component. An example of a change log element 900 is illustrated in FIG. 9. As illustrated in FIG. 9, optionally, change log element 900 can be configured to use a custom hash function to detect duplication. This stream process element reduces unnecessary processing in the downstream path.

Figure 10:
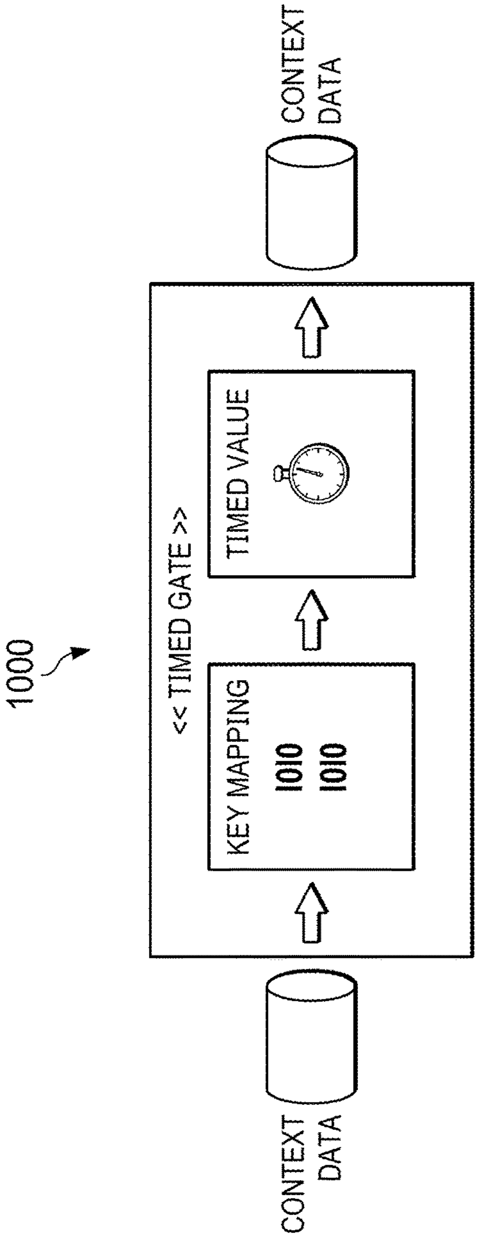
FIG. 10 depicts an example of a timed gate element.

Another type of stream process element is a timed gate element. This stream process element acts as a valve in a process to suppress messages within a specified time interval. An example of a timed gate 1000 is illustrated in FIG. 10. As illustrated in FIG. 10, timed gate 1000 has a key mapping component and a timed valve. Timed gate 1000 can be used to filter out events that arrive at a high frequency, but most of those messages can be discarded. This stream process element reduces unnecessary processing in the downstream path.

Figure 11:
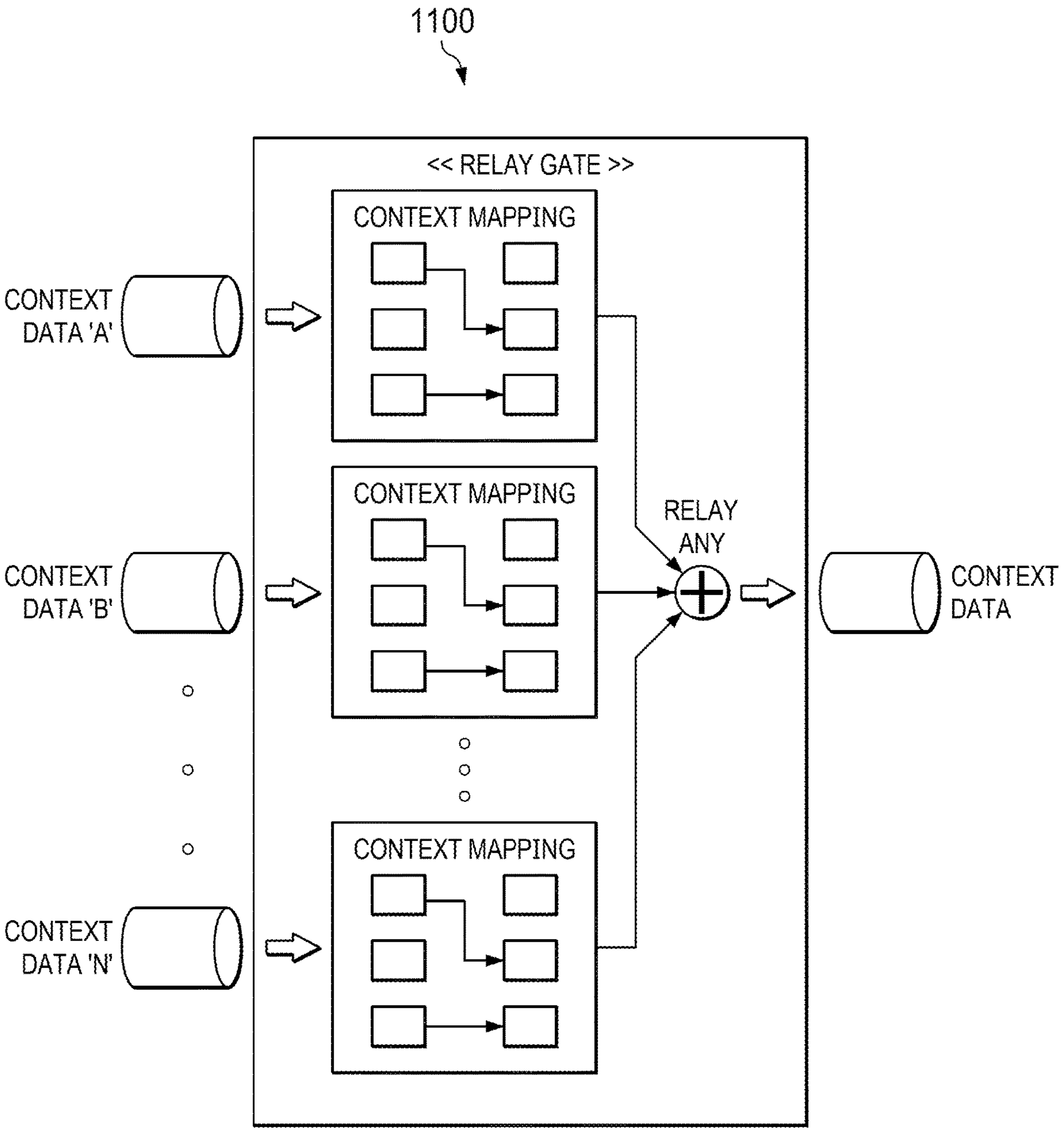
FIG. 11 depicts an example of a relay gate element.

Another type of stream process element is a relay gate. This stream process element acts as a relay to allow messages from multiple processing paths to be routed to a single downstream path. An example of a relay gate 1100 is illustrated in FIG. 11. As illustrated in FIG. 11, relay gate 1100 has a plurality of context mapping components for context mapping messages from different processing paths and a relay component for relaying context-mapped messages to a single downstream path. This multi-to-one relay-mapping differs from the stream join element discussed above, as relay gate 1100 only forwards messages to the downstream path from any input paths without joining those messages. In some embodiments, a relay gate element can also be used in a process path to form a processing loop.

Figure 12:
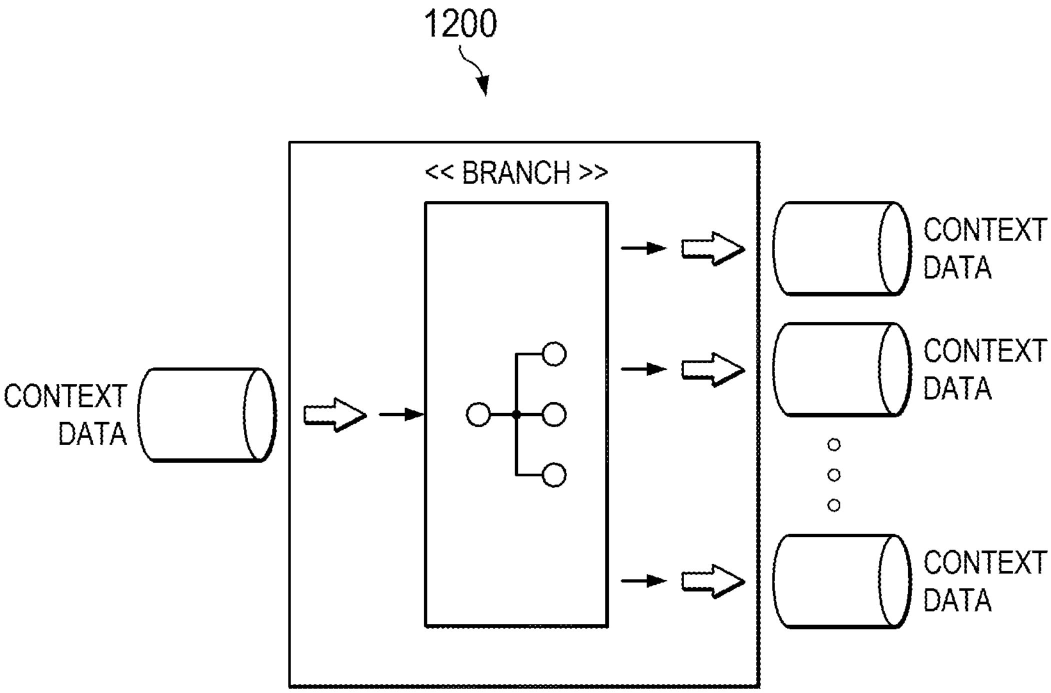
FIG. 12 depicts an example of a branch element.

Another type of stream process element is a branch element. This stream process element can be used in a process to fork independent parallel paths of processing. Those paths can be merged/synchronized at a later stage using a merge element discussed below. An example of a branch element 1200 is illustrated in FIG. 12. In some embodiments, if merging/synchronization is not required, independent parallel processing paths can also be forked without using a branch element.

Figure 13:
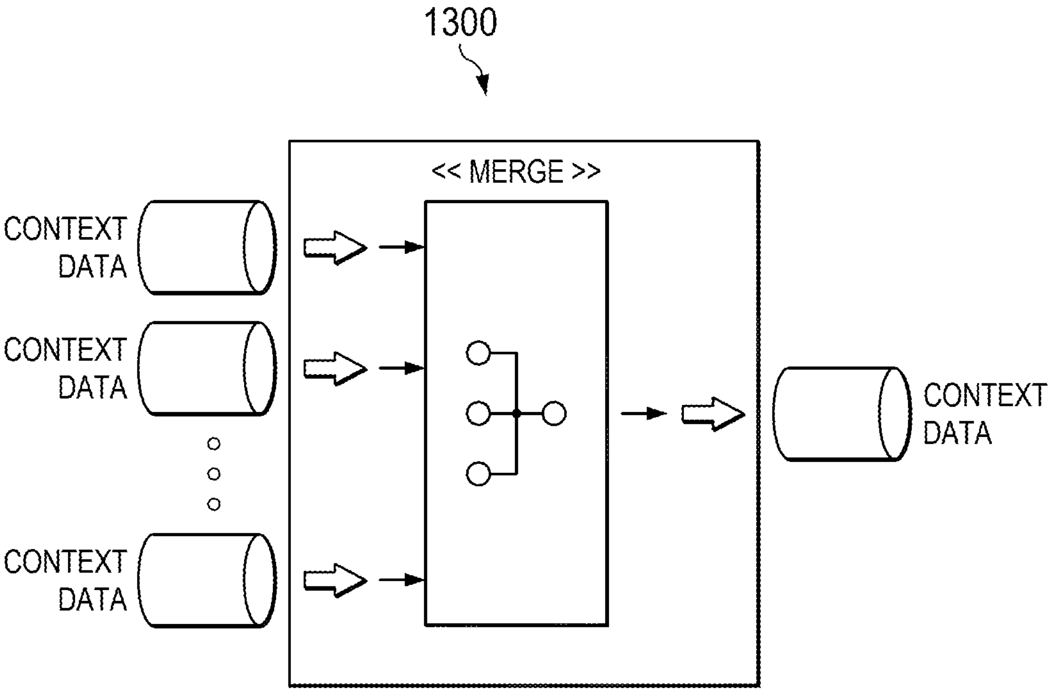
FIG. 13 depicts an example of a merge element.

Another type of stream process element is a merge element. This stream process element can be used in a process to merge/synchronize multiple independent parallel processing paths that were forked by using a branch element. An example of a merge element 1300 is illustrated in FIG. 13. In some embodiments, a merge element cannot be used if parallel processing paths were forked without using a branch element.

Figure 14:
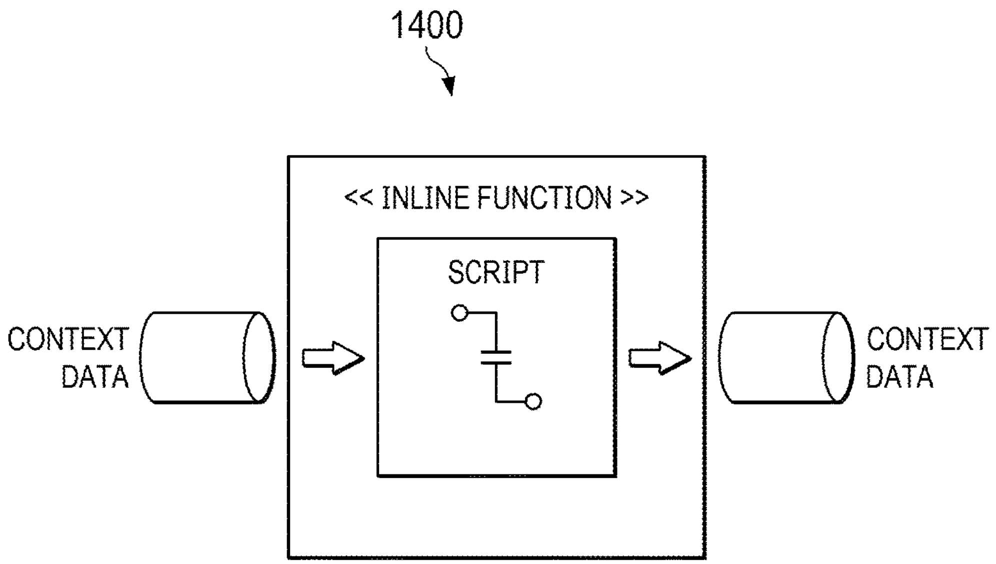
FIG. 14 depicts an example of an inline function element.

Another type of stream process element is an inline function element. This stream process element can be used in a process to add a lightweight inline function or custom logic in a process flow. An example of an inline function element 1400 is illustrated in FIG. 14. As a non-limiting example, the inline function can be written in JavaScript programming language syntax. JavaScript programming language syntax is known to those skilled in the art and thus is not further described herein. For complex functions, map or reduce operations can be used. These operations can be executed as micro services through the service runtime of Vega Processor (e.g., Service Runtime 250 of Vega Processor 200).

Figure 15:
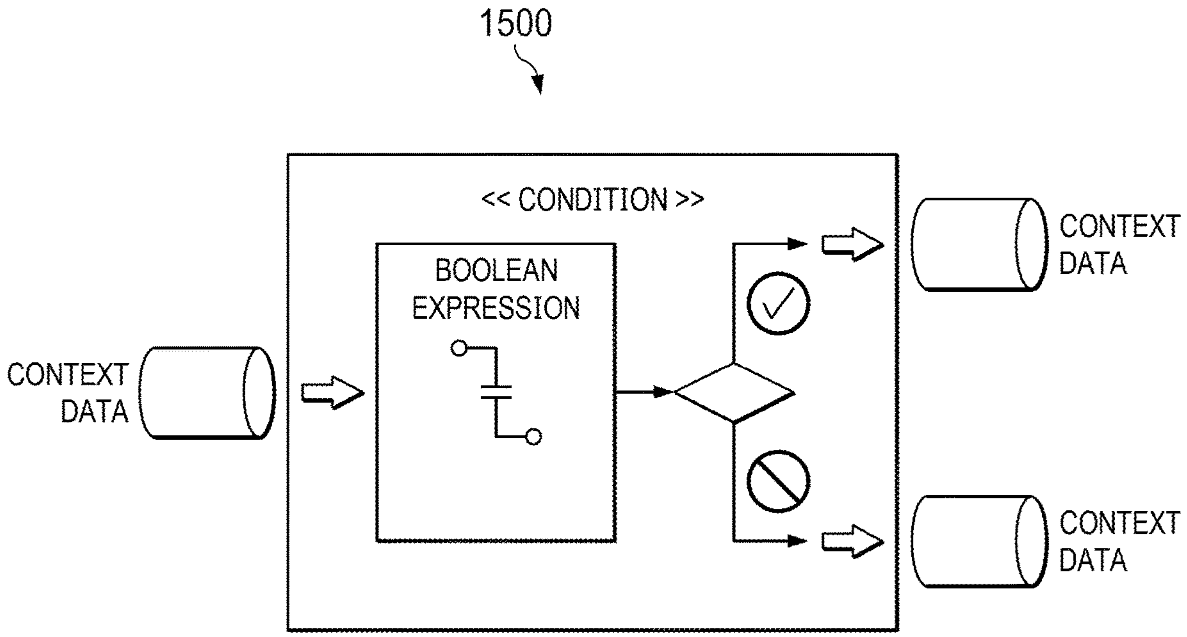
FIG. 15 depicts an example of a condition element.

Another type of stream process element is a condition element. This stream process element can be used in a process to control the flow of execution based on a specified Boolean expression. An example of a condition element 1500 is illustrated in FIG. 15. Boolean expressions are known to those skilled in the art and thus are not further described herein.

Figure 16:
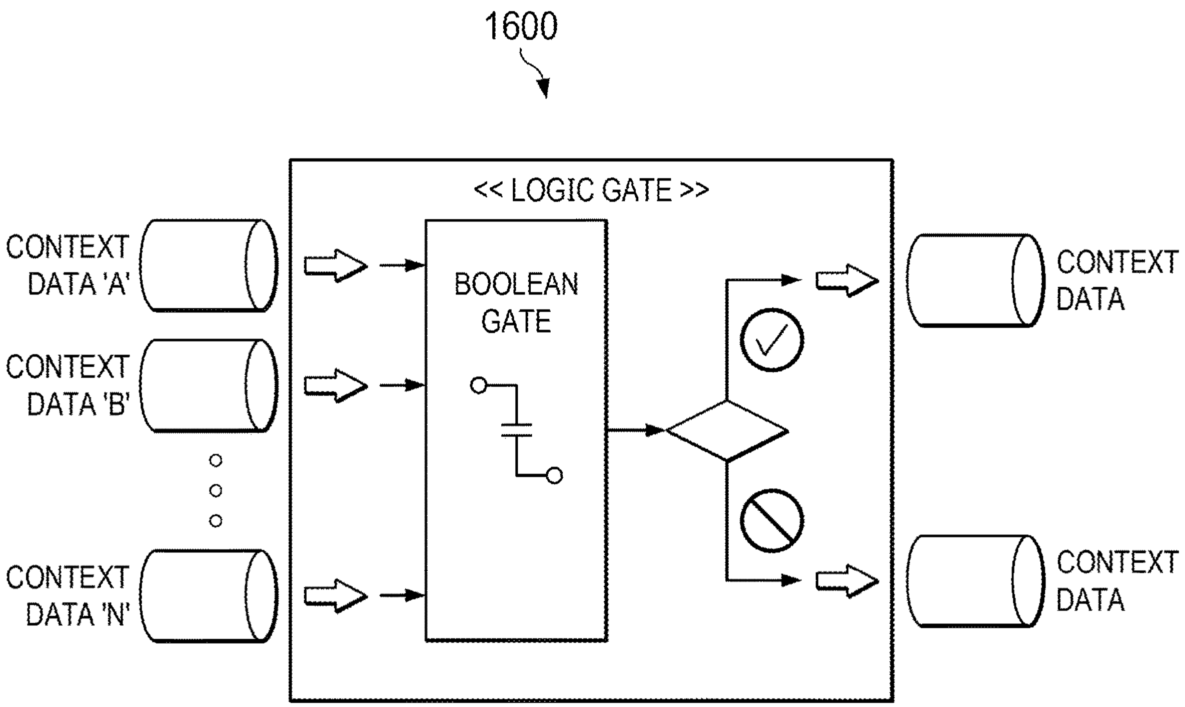
FIG. 16 depicts an example of a logic gate element.

Another type of stream process element is a logic gate element. This stream process element can be used in a process flow to apply a logical gateway operation on outputs of multiple condition elements. An example of a logic gate element 1600 is illustrated in FIG. 16. In some embodiments, the logical gateway operation can be implemented as a convenient function, which can be expressed in terms of other operations. As a non-limiting example, similar functionality can be achieved by using an inline function element with a Boolean expression followed by a condition element. Convenient functions are known to those skilled in the art and thus are not further described herein.

Figure 17:
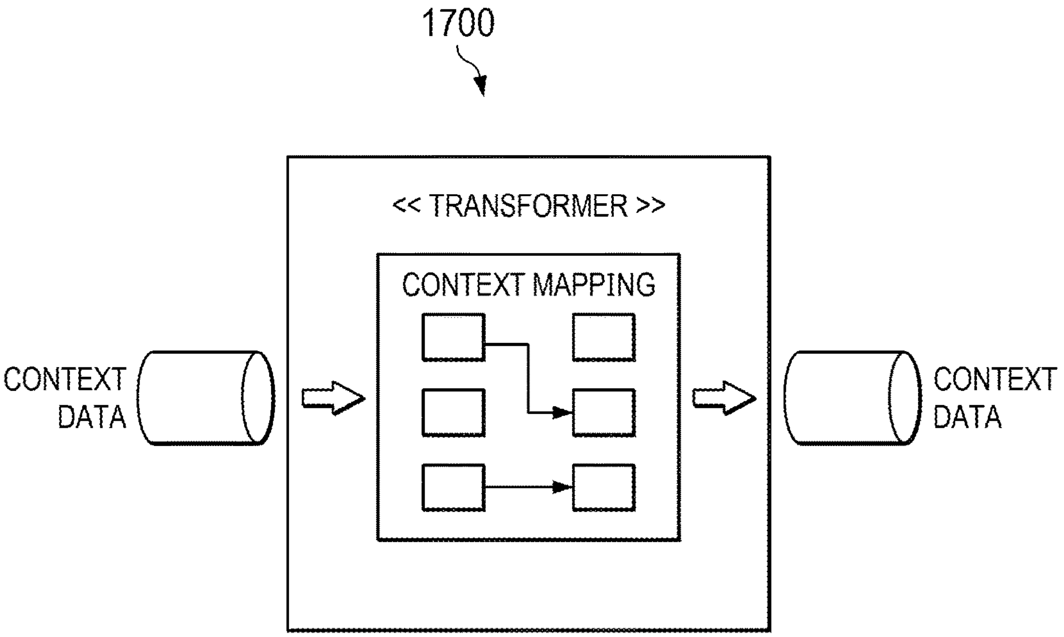
FIG. 17 depicts an example of a transformer element.

Another type of stream process element is a transformer element. This stream process element can be used in a process to transform or to re-map the attributes in the process context. An example of a transformer element 1700 is illustrated in FIG. 17. In some embodiments, the transforming or re-mapping operation can be implemented as a convenient function. As a non-limiting example, similar functionality can be achieved by using an inline function to produce a transformed attribute set for a message of interest.

Figure 18:
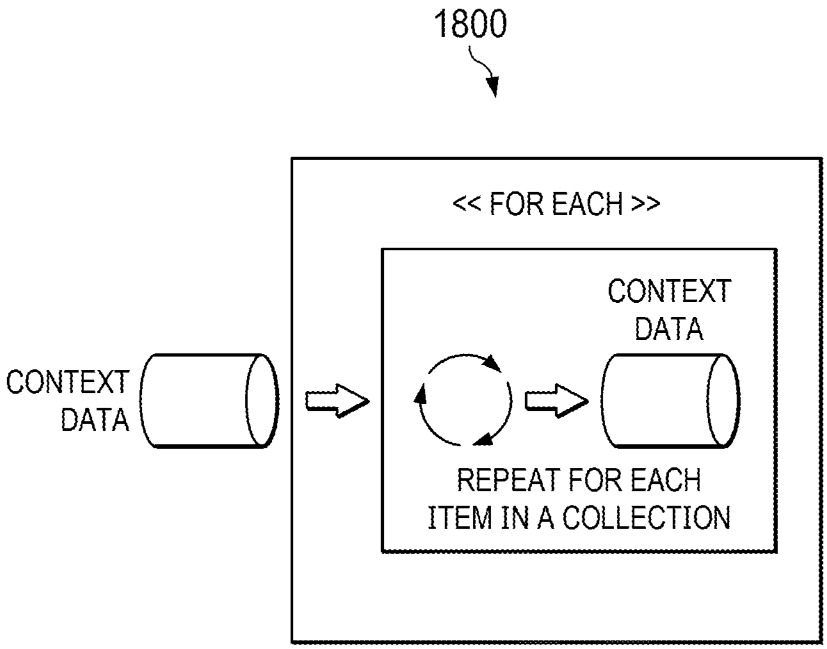
FIG. 18 depicts an example of a "for each" element.

Another type of stream process element is a "for each" element. This stream process element can be used in a process to iterate over a collection or attributes in an event. An example of a for each element 1800 is illustrated in FIG. 18. Downstream from a for each element is processed for each item in a specified collection.

Figure 19:
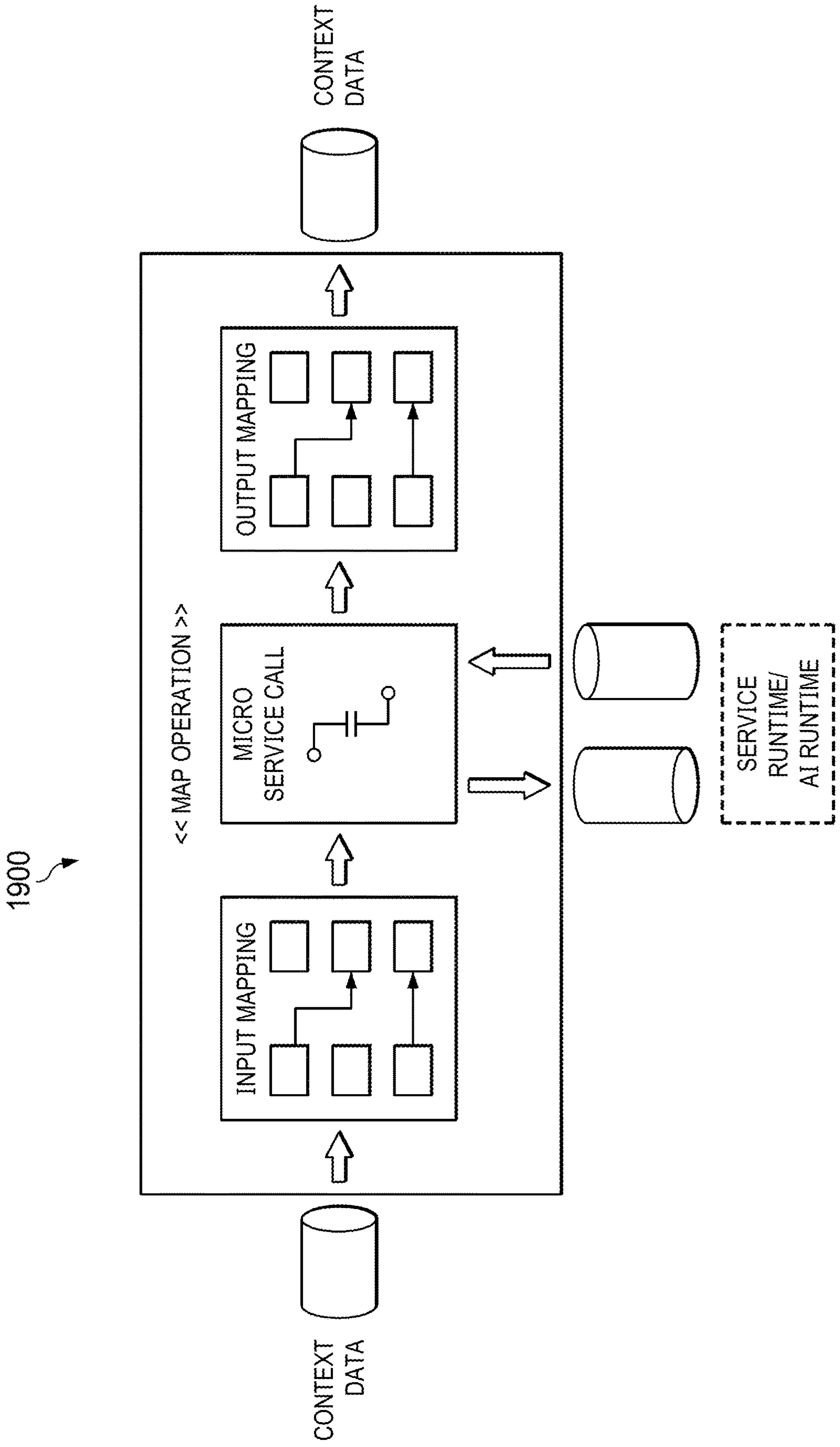
FIG. 19 depicts an example of a map operation element.

Another type of stream process element is a map operation element. This stream process element can be used in a process to map each event to a ML Predict Service or a Service microservice, hosted in an AI Runtime (e.g., AI Runtime 230, described above) or a Service Runtime (e.g., Service Runtime 250, described above), respectively. An example of a map operation element 1900 is illustrated in FIG. 19. In some embodiments, Map and Flat Map services are supported. In a Map operation, one input event can generate 0 or 1 output event; whereas, in a Flat Map operation, one input may generate 0 or any number of output events.

Figure 20:
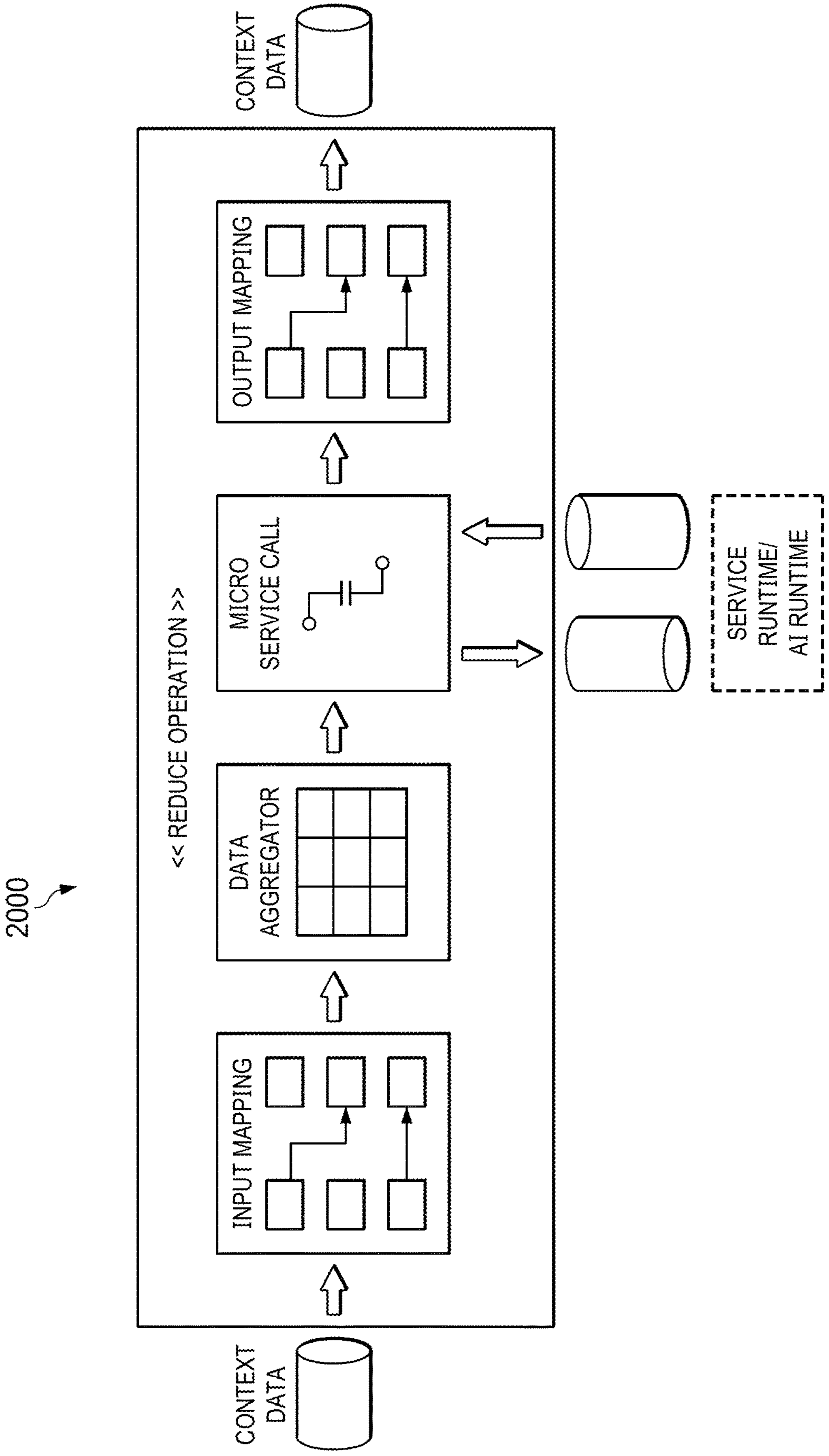
FIG. 20 depicts an example of a reduce operation element.

Another type of stream process element is a reduce operation element. This stream process element can be used in a process to aggregate a set of messages using a group by key or key expression and based on window size, time window, or conditional flush, to invoke a ML Predict Service or a Service microservice hosted in an AI Runtime (e.g., AI Runtime 230, described above) or a Service Runtime (e.g., Service Runtime 250, described above), respectively. An example of a reduce operation element 2000 is illustrated in FIG. 20. In some embodiments, in a reduce operation, one or N number of aggregated input events can generate 0 or 1 output.

Figure 21:
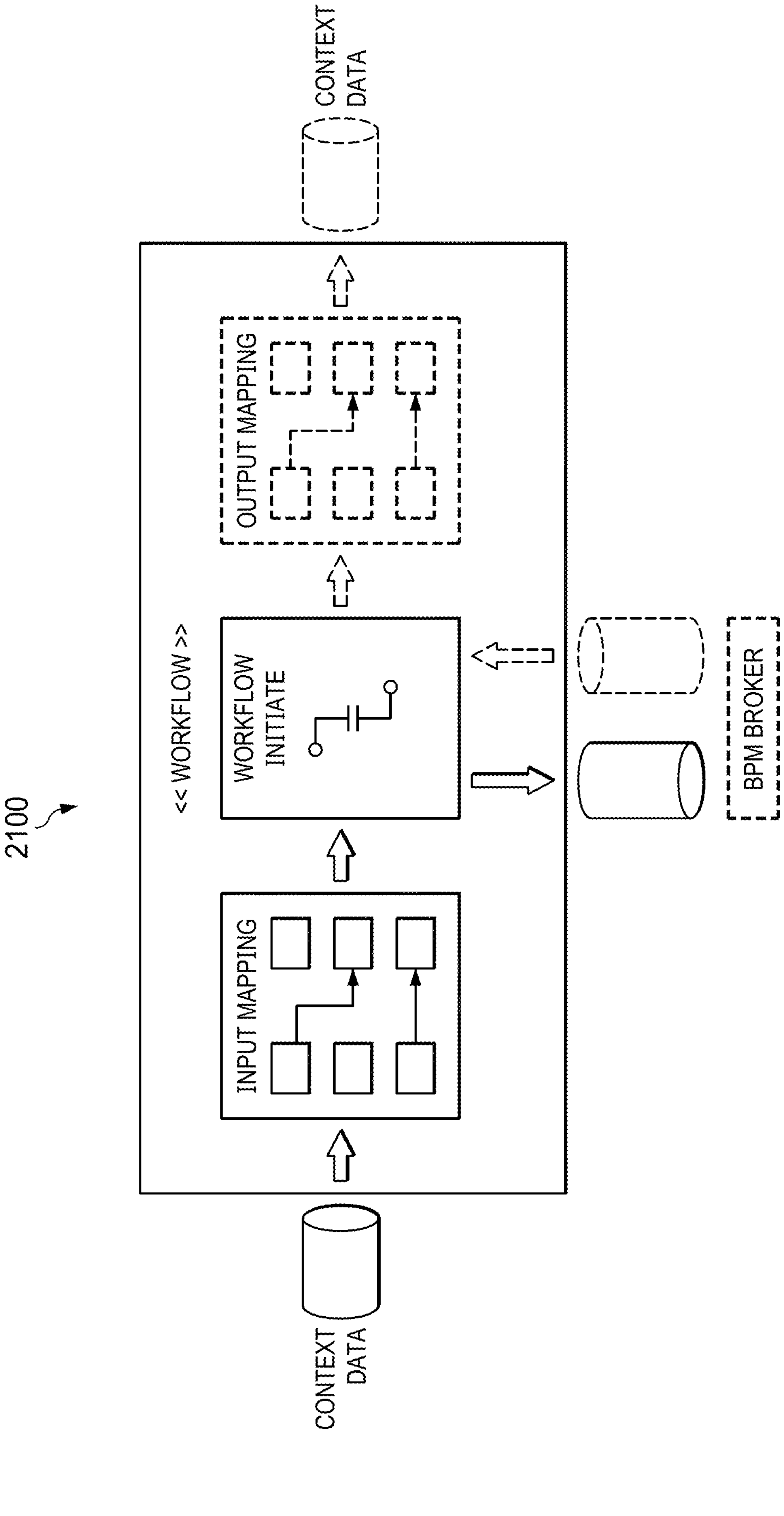
FIG. 21 depicts an example of a workflow element.

Another type of stream process element is a workflow element. This stream process element can be used in a process to dispatch workflow instances in a target BPM engine. An example of a workflow element 2100 is illustrated in FIG. 21. In some embodiments, a Workflow element may be configured to retrieve the output of a BPM process that runs without manual activities. In some embodiments, if the BPM process has manual activities, the workflow element will not wait for the output data from the workflow instance.

Figure 22:
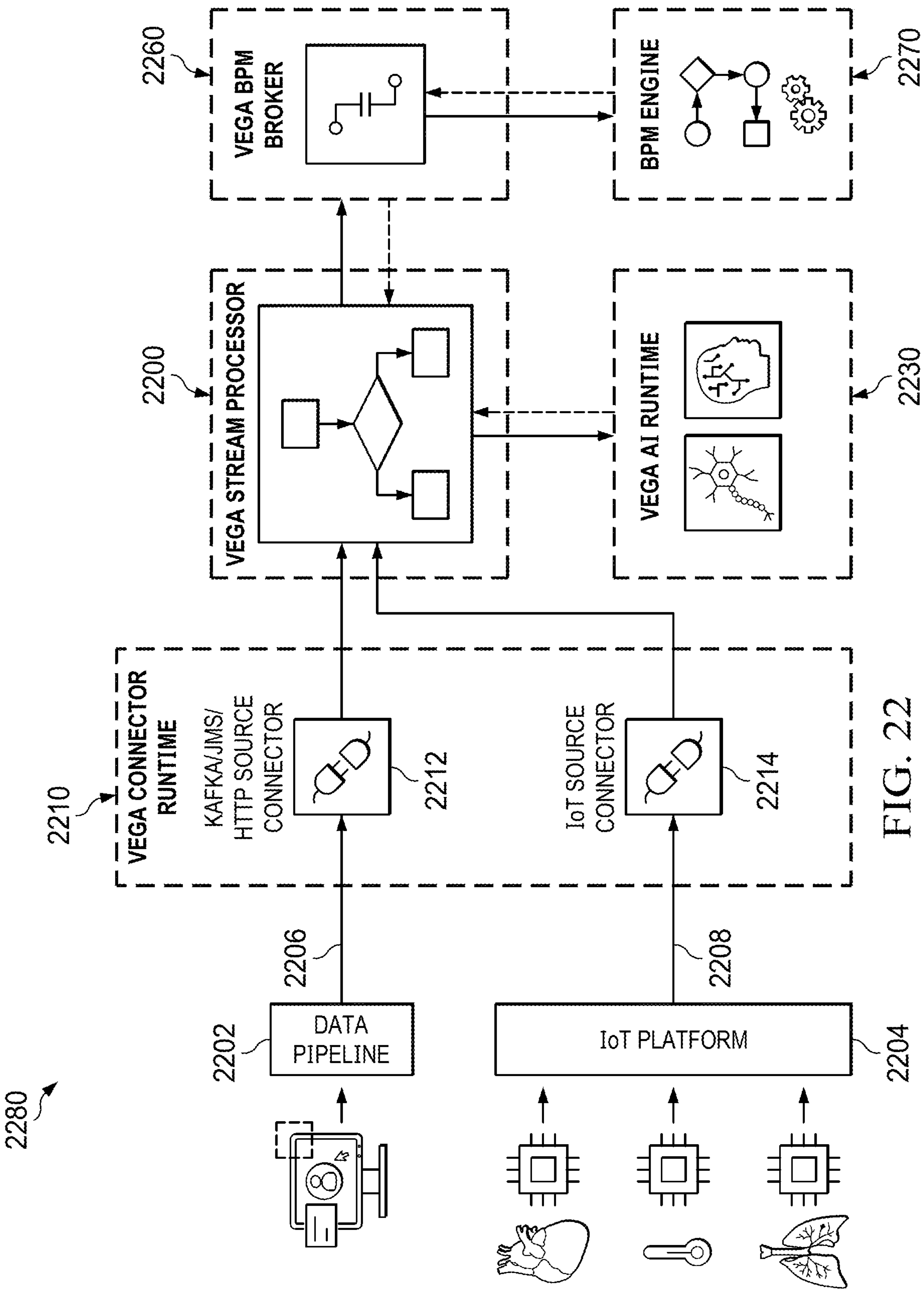
FIG. 22 depicts an example of a stream process designed to be processed by an embodiment of a processing orchestration platform.

Following is one example of a use case for the orchestration engine described above. Numerous other uses cases are possible, as one skilled in the art would understand. FIG. 22 depicts an example of a stream process 2280 designed to be processed by an embodiment of Vega Processor 2200. This example use case enables the automated monitoring of patients in a hospital setting to help medical staffs and doctors with pre-analyzed medical data of patients received through connected devices. The high-level diagram shown in FIG. 22 depicts the deployment of artifacts and flow of messages for this particular use case. In the example of FIG. 22, Stream Processor 2200 is configured for orchestrating microservices hosted as a Service or a ML Prediction Service. Multiple source connectors 2212, 2214 are deployed on a connector runtime 2210 for streaming event streams 2206, 2208 from disparate sources (e.g., data pipeline 2202, IoT platform 2204). As discussed above, these connectors are highly available, distributed, and load balanced.

In the example of FIG. 22, AI runtime 2230 provides a distributed parallel processing microservice service bus and runtime that hosts ML prediction service modules (described above). Further, lifecycle and execution of a ML prediction service is maintained by AI runtime 2230. BPM broker 2260 works as a managed dispatcher for a BPM process. BPM broker 2260 decouples the system services in Vega Processor 2200 from external BPM engines such as BPM engine 2270.

Figure 23:
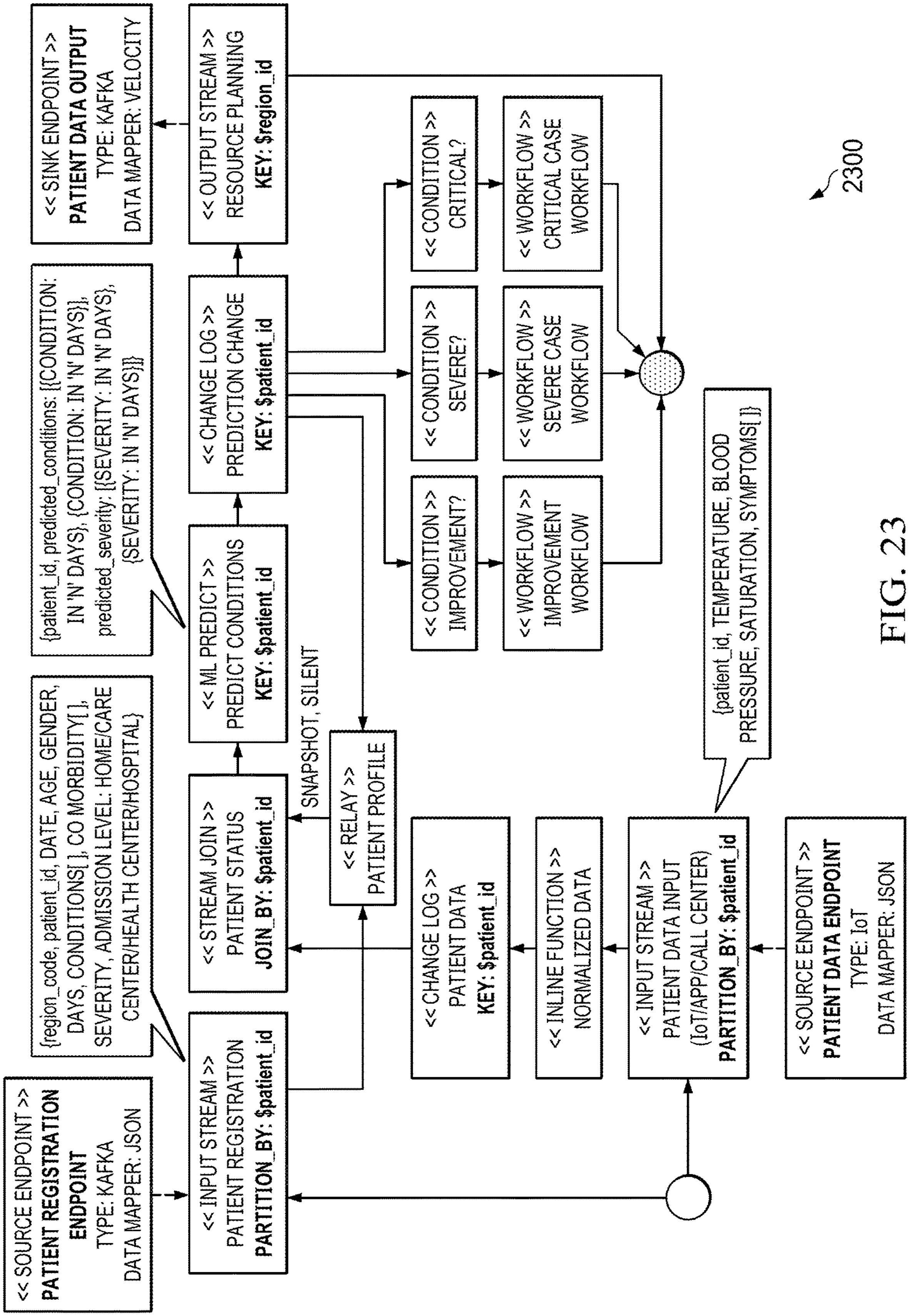
FIG. 23 depicts a flow of an exemplary stream process.

Those skilled in the art can appreciate that embodiments of an orchestration engine disclosed herein may vary from implementation to implementation. Therefore, details shown in FIG. 22 are not meant to be limiting. As a non-limiting example, this use case applies a statistical model without using online and reinforcement learning to predict the condition of the patient and to initiate a BPM workflow. The flow of an exemplary stream process 2300 is depicted in FIG. 23. As illustrated in FIG. 23, stream process 2300 is configured with a stream Input element named Patient Registration. This stream input element reads data from a source endpoint named Patient Registration Endpoint, which consumes messages from a data pipeline 2202 (FIG. 22) such as an Apache Kafka channel. Stream process 2300 is further configured with a stream input element named Patient Data Input, which is configured to read an event stream from another source endpoint named Patient Data Endpoint. This Stream Input element is configured for listening to events coming from devices attached to a patient through an IoT platform 2204 (FIG. 22). In some embodiments, the continuous nature of the data that directly streams from the devices are normalized/discretized by using an inline function element named Normalized Data. To suppress/filter out duplicate/unchanged data from the devices, a change log element in the process named Patient Data is used.

To represent the complete updated profile of the patient, the patient's registration data is joined with the normalized data from received from the connected devices. A stream join element named Patient Status is used to perform an INNER JOIN on the data by patient identifier ("patient_Id"). Based on the data received from the sensors attached to the patient, the ML predict element named Predict Conditions predicts a change in the underlying conditions of the patient. In order to make this prediction, the stream join element named Patient Status performs a join operation on the latest normalized data received from the devices with the latest predicted underlying condition data. A relay gate named Patient Profile is used to facilitate this requirement. The stream join element named Patient Status is configured to use the input stream from the relay gate named Patient Profile as a snapshot and silent, so that it is treated as an updated view that does not trigger a join operation. Join is triggered only by the normalized device data from the change log element named Patient Data.

In the example of FIG. 23, another change log element named Prediction Change is used to suppress the consecutive duplicate predictions from the Predict Conditions element. If the prediction for the underlying conditions changes, the latest prediction is forwarded to the Patient Profile.

For output, a stream output element named Resource Planning is used. In this case, Resource Planning is configured for writing the prediction data to an Apache Kafka Channel though a sink endpoint named Patient Data Output. Based on the prediction of the Predict Conditions, respective BPM workflows are automatically initiated using workflow elements such as Improvement Workflow, Severe Case Workflow, or Critical Case Workflow, respectively. In this use case, the ML predict element named Predict Conditions predicts the underlying conditions of the patient by applying a statistical model to patient profile data such as, co-morbidity, age, gender, days since onset of symptoms along with current symptoms—fever, saturation, etc. The Predict Conditions element can use any suitable statistical procedure to train the likelihood/emission probability model, as one skilled in the art would understand.

As described above, a stream process is composed of predefined elements of various types. An orchestration engine is adapted for running such a stream process to automatically initiate appropriate workflows. As the above example use case illustrates, implementing a stream process for processing by the orchestration engine to thereby automatically initiate BPM workflows does not require any manual coding. Accordingly, the invention provides a zero-code orchestration for advanced stream processing with join, map/reduce, and AI integration, for instance, with an IoT platform. Further, the invention provides a machine interface for machine-initiated BPM processes. As discussed above, current BPM tools provide connectors for streaming platforms. However, these BPM tools are designed for message-oriented processing and require custom codes/framework to be written for supporting event processing, map/reduce, and AI integration. Further, these BPM tools do not provide zero code advanced stream processing options such as stream snapshot, silent stream join, relay gate, change log, timed gate, inline function.

Figure 24:
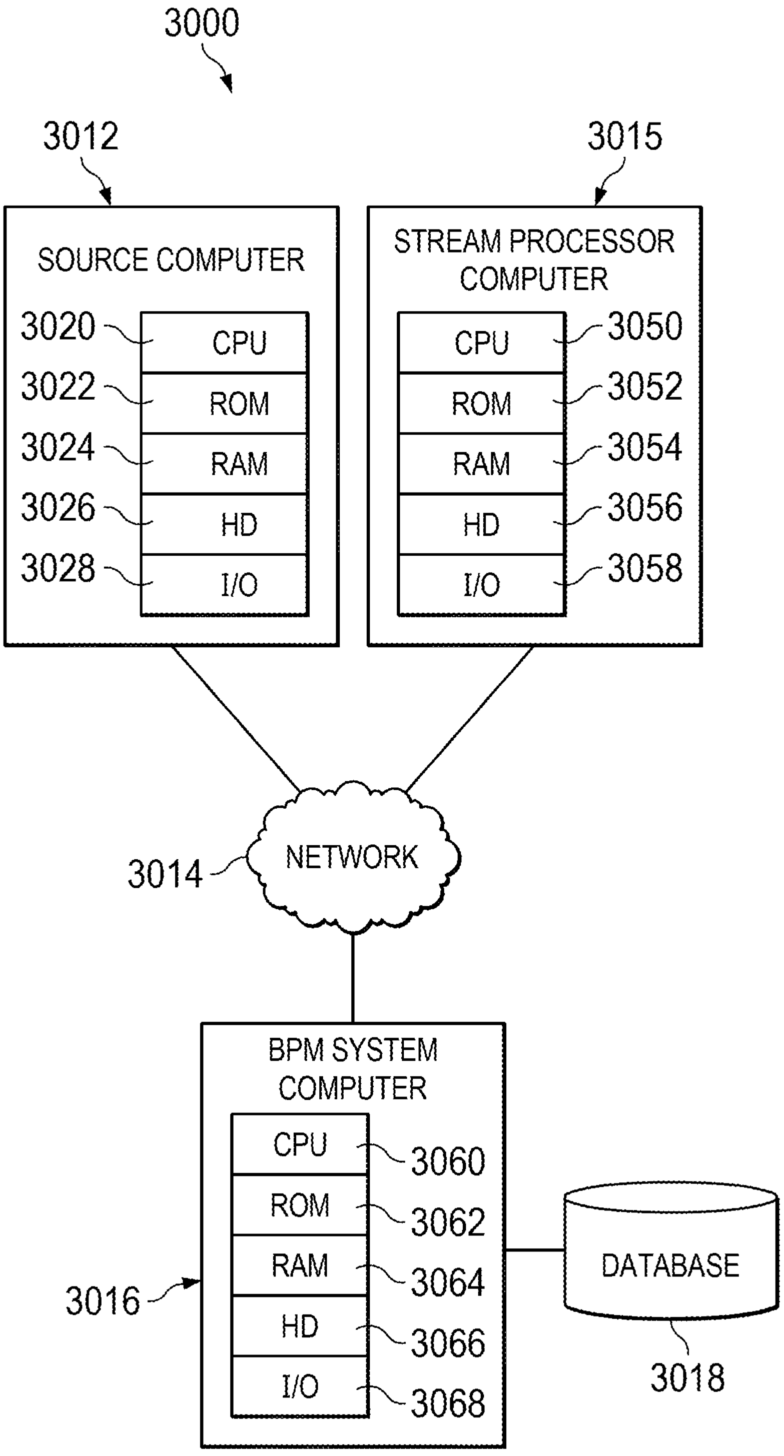
FIG. 24 depicts a diagrammatic representation of a distributed network computing environment where embodiments disclosed can be implemented.

FIG. 24 depicts a diagrammatic representation of a distributed network computing environment where embodiments disclosed can be implemented. In the example illustrated, network computing environment 3000 includes network 3014 that can be bi-directionally coupled to source computer 3012, stream processor computer 3015, and BPM system computer 3016. BPM system computer 3016 can be bi-directionally coupled to data store 3018. Network 3014 may represent a combination of wired and wireless networks that network computing environment 3000 may utilize for various types of network communications known to those skilled in the art.

For the purpose of illustration, a single system is shown for each of computer 3012, computer 3015, and computer 3016. However, with each of computer 3012, computer 3015, and computer 3016, a plurality of computers (not shown) may be interconnected to each other over network 3014. For example, a plurality of source computers 3012 and a plurality of BPM system computers 3016 may be coupled to network 3014. Source computers 3012 may include data processing systems for communicating with stream processor computer 3015. Stream processor computers 3015 may include data processing systems for communicating with BPM system computers 3016.

Source computer 3012 can include central processing unit ("CPU") 3020, read-only memory ("ROM") 3022, random access memory ("RAM") 3024, hard drive ("HD") or storage memory 3026, and input/output device(s) ("I/O") 3028. I/O 3029 can include a keyboard, monitor, printer, electronic pointing device (e.g., mouse, trackball, stylus, etc.), or the like. Source computer 3012 can include a desktop computer, a laptop computer, a personal digital assistant, a cellular phone, or nearly any device capable of communicating over a network. Stream processor computer 3015 may comprise CPU 3050, ROM 3052, RAM 3054, HD 3056, and I/O 3058, similar to source computer 3012.

Likewise, BPM system computer 3016 may include CPU 3060, ROM 3062, RAM 3064, HD 3066, and I/O 3068. BPM system computer 3016 may include one or more backend systems configured for providing a variety of services. These services may utilize data stored in data store 3018. Many other alternative configurations are possible and known to skilled artisans.

Each of the computers in FIG. 30 may have more than one CPU, ROM, RAM, HD, I/O, or other hardware components. For the sake of brevity, each computer is illustrated as having one of each of the hardware components, even if more than one is used. Each of computers 3012, 3015, and 3016 is an example of a data processing system. ROM 3022, 3052, and 3062; RAM 3024, 3054, and 3064; HD 3026, 3056, and 3066; and data store 3018 can include media that can be read by CPU 3020, 3050, or 3060. Therefore, these types of memories include non-transitory computer-readable storage media. These memories may be internal or external to computers 3012, 3015, or 3016.

Portions of the methods described herein may be implemented in suitable software code that may reside within ROM 3022, 3052, or 3062; RAM 3024, 3054, or 3064; or HD 3026, 3056, or 3066. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

In one embodiment, a system may comprise at least one processor, at least one non-transitory computer-readable storage medium, and stored instructions translatable by the at least one processor to implement a method substantially as described herein. Another embodiment comprises a computer program product having at least one non-transitory computer-readable storage medium storing instructions translatable by at least one processor to perform a method substantially as described herein. Numerous other embodiments are also possible.

These, and other, aspects of the disclosure will be better appreciated and understood when considered in conjunction with the accompanying drawings and details and examples provided in the accompanying Appendix B, which forms part of this disclosure. It should be understood, however, that the description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system for zero code stream processing orchestration, the system comprising:

a processor;

a non-transitory computer-readable medium; and instructions stored on the non-transitory computer-readable medium and translatable by the processor for providing a plurality of runtime services, including:

a connector runtime configured for deploying a source connector for connecting to disparate source endpoints and streaming event streams from the disparate source endpoints;

a stream processor configured for orchestrating microservices, including a machine learning (ML) service, operating on messages in the event streams;

an artificial intelligence (AI) runtime configured for providing a distributed parallel processing microservice service bus and runtime that hosts a ML prediction service, wherein the ML prediction service is trained to make a prediction based at least in part on the messages from the stream processor; and a business process management (BPM) broker runtime service that decouples the stream processor from external BPM engines and automatically initiates BPM workflows at the external BPM engines based on the prediction.

2. The system of claim 1, wherein the disparate sources comprise a data pipeline.

3. The system of claim 1, wherein the disparate sources comprise an Internet-of-Things platform.

4. The system of claim 1, wherein the disparate sources comprise a data pipeline and an Internet-of-Things platform.

5. The system of claim 1, wherein the plurality of runtime services further includes an AI knowledge base for training and predicting state data of the ML prediction service.

6. The system of claim 1, wherein the plurality of runtime services further includes a service runtime for handling lifecycle and execution of a service module.

7. The system of claim 1, wherein the connector runtime is further configured for deploying a sink connector for a sink endpoint.

8. The system of claim 1, wherein the event streams are initiated by machines.

9. The system of claim 1, wherein the disparate source endpoints, the connector runtime, the stream processor, the AI runtime, the BPM broker, and the BPM workflows are distributed across different computing environments.

10. A method comprising:

deploying, by a connector runtime, a source connector for connecting to disparate source endpoints and streaming event streams from the disparate source endpoints;

orchestrating, by a stream processor, microservices, including a machine learning (ML) service, operating on messages in the event streams;

providing, by an artificial intelligence (AI) runtime, a distributed parallel processing microservice service bus and runtime that hosts a ML prediction service, wherein the ML prediction service is trained to make a prediction based at least in part on the messages from the stream processor; and automatically initiating, by a business process management (BPM) broker runtime service that decouples the stream processor from external BPM engines and, BPM workflows at the external BPM engines based on the prediction.

11. The method of claim 10, wherein the disparate sources comprise a data pipeline, an Internet-of-Things platform, or a combination thereof.

12. The method of claim 10, wherein the disparate sources comprise a data pipeline and an Internet-of-Things platform.

13. The method of claim 10, wherein the plurality of runtime services further includes an AI knowledge base for training and predicting state data of the ML prediction service.

14. The method of claim 10, wherein the plurality of runtime services further includes a service runtime for handling lifecycle and execution of a service module.

15. The method of claim 10, wherein the connector runtime is further configured for deploying a sink connector for a sink endpoint.

16. The method of claim 10, wherein the event streams are initiated by machines.

* * * * *